United States Patent [19]
Paton et al.

[11] Patent Number: 5,361,084
[45] Date of Patent: Nov. 1, 1994

[54] METHOD OF MULTI-TONE PRINTING

[75] Inventors: Anthony D. Paton, Cambridge, England; Walter S. Bartky, Chicago; Alan J. Michaelis, Glen Ellyn, both of Ill.

[73] Assignee: XAAR Limited, Cambridge, England

[21] Appl. No.: 594,772

[22] Filed: Oct. 9, 1990

[30] Foreign Application Priority Data

Oct. 10, 1989 [GB] United Kingdom ............ 8922821
Jan. 23, 1990 [GB] United Kingdom ............ 9001493

[51] Int. Cl.⁵ .................. B41J 2/205; B41J 2/045
[52] U.S. Cl. ...................................... 347/15; 347/43; 347/69
[58] Field of Search ............ 346/140 R, 1.1, 75; 358/298

[56] References Cited

U.S. PATENT DOCUMENTS

| | | | |
|---|---|---|---|
| 4,513,299 | 4/1985 | Lee et al. | 346/140 R |
| 4,536,097 | 8/1985 | Nilsson | 400/126 |
| 4,746,935 | 5/1988 | Allen | 346/140 R |
| 4,873,535 | 10/1989 | Sasaki | 346/1.1 |
| 4,887,100 | 12/1989 | Michaelis et al. | 346/140 R |
| 4,908,635 | 3/1990 | Iwasawa et al. | 346/140 R |
| 5,016,028 | 5/1991 | Temple | 346/140 R |

FOREIGN PATENT DOCUMENTS

| | | | |
|---|---|---|---|
| 0124190 | 7/1984 | European Pat. Off. | B41J 3/04 |
| 0293863 | 12/1986 | Japan | 346/140 R |
| 8509702 | 10/1985 | United Kingdom | B41J 3/04 |

*Primary Examiner*—Benjamin R. Fuller
*Assistant Examiner*—Alrick Bobb

[57] ABSTRACT

A method of multi-tone printing employs a drop-on-demand printing apparatus for depositing ink droplets on printing element areas of a substrate which is movable relatively to the apparatus. The droplets are deposited from an array of channels on the substrate which is movable relatively to the channels. The channels length and nozzle location and dimensions afford each channel with a high longitudinal resonant frequency and energy pulses are supplied to selected channels at or near the resonant frequency of the channels to deposit from each selected channel in the corresponding printing element area of the substrate a number of drops equal to the number of pulses applied thereto, the number of pulses applied being dependent on the tone of printing required. Single channel and color versions of the invention are also disclosed.

25 Claims, 3 Drawing Sheets

METHOD OF MULTI-TONE PRINTING

This invention relates to multi-tone printing employing drop-on-demand printing apparatus. More particularly the invention relates to such apparatus for printing droplets on printing element areas on a substrate which is movable relatively to said apparatus and comprises an array of parallel, uniformly spaced channels provided with respective droplet ejection nozzles, a liquid supply means common to said channels and electrically operated means for applying pulses of energy to droplet liquid in said channels to effect droplet ejection therefrom.

Aspects of such printing apparatus are described for example in U.S. Pat. No. 4,584,590 and our U.S. Pat. Nos. 4,887,100 and 4,879,568 of which the contents of the latter are herein incorporated by reference.

The types of printing apparatus disclosed in the references quoted are of the kind in which energy pulses are imparted to droplet liquid by displacement of wall portions of the respective droplet liquid channels. The present invention is, however, also applicable to drop-on-demand printing apparatus having an array of channels such as is known from U.S. Pat. No. 3,179,042, GB-A-2,007,162 and GB-A-2,106,039 in which droplet ejection is effected from the channels by applying a pulse of thermal energy to droplet liquid therein.

It is known that the human eye can sense sixty-four gradations of greyscale in multi-tone printing. It is even suggested that as many as 128 gradations can be discriminated. Accordingly, it is one aim of high quality tone printing, including color printing, to produce a printer capable of printing a number of greyscale tones as near as possible to the discriminating capability of the eye of the viewer.

In U.S. Pat. No. 4,513,299 there is disclosed a single channel, drop-on-demand ink jet printing device in which droplets of ink having different droplet volumes can be deposited on a print medium at a droplet repetition rate just below the resonant frequency of the ink channel. The different droplet volumes are achieved by following a droplet ejection pulse with additional droplet ejection pulses of like magnitude to the initial droplet ejection pulse at a frequency at or near the channel resonant frequency. The additional droplet ejection pulses cause ejection from the ink channel of further drop volumes of substantially the same size as the drop volume emitted from the channel by the initial droplet ejection pulse. In the series of drop volumes thus emitted, the second and subsequent drop volumes are each connected to the preceding drop volume emitted and the drop volumes join together to form an enlarged droplet which is deposited on the print medium. However, in high density array drop-on-demand printers, i.e. arrays of at least two parallel channels per mm, the known method of droplet ejection severely limits, to only a few, the number of droplet volumes which can be added to the droplet volume initially ejected from any particular channel. This number diminishes rapidly with increase of channel density. It follows that the number of greyscale gradations which can be achieved by this known method is limited in the achievable number of different drop volumes which can be deposited at a pixel of the printed image.

It is, accordingly, an object of the present invention, to provide an improved method of greyscale printing which employs a drop-on-demand printer having an array of parallel channels which enables printing of a substantially greater number of greyscale gradations than has been achievable hitherto.

The present invention resides in a method of multi-tone printing employing drop-on-demand printing apparatus comprising an array of like uniformly spaced parallel channels, respective ink ejection nozzles provided for the channels, and forming part of the channels, each of the channels having the same high longitudinal acoustic resonant frequency, an ink supply common to the channels, electrically actuatable means for applying pulses of energy to ink in the channels to effect ejection of droplets of ink therefrom and a substrate movable relative to the channels and having printing element areas on which the droplets are deposited, the method comprising the step of identifying selected ones of the channels for actuation in successive periods, determining a desired tone of printing for each selected channel and applying to ink in each selected channel a respective sequence of pulses of energy of amplitude and frequency to cause ink droplet ejection therefrom at or near the resonant frequency of the channels, each sequence of pulses containing a number of pulses to eject a corresponding number of discrete droplets for effecting the printing tone determined for the respective channel.

Preferably, the method of the invention includes supplying the sequences of pulses of energy to ink in the selected channels by displacing respective side wall portions of the selected channels. Alternatively, the sequences of pulses of energy may be supplied by imparting sequences of thermal stresses to the ink in the selected channels.

Preferably, the energy pulses are applied to ink in the selected channels at a frequency of at least 25 KHz and desirably, in the range of 50 KHz to 250 KHz.

The invention also contemplates printing each line of printing element areas in a direction transverse to the direction of relative motion of the array and substrate, with the substrate and the array stationary and effecting relative movement of the array and substrate between each printing operation by an amount equal to the printing element area dimension in the direction of such relative movement. For color printing, the invention includes printing each printing element area from one of four channels having respective ink supplies of black ink and ink of the three primary colors, thereby enabling printing of the area in black or in one of the primary colors.

Suitably, the method of the invention also includes depositing the sequences of droplets from the selected channels over approximately two thirds of the length of the respective printing element areas of the substrate by traversing the channels from which the droplet sequences issue. Advantageously, the sequences deposited include any number up to sixty four droplets.

In one embodiment the method of the invention comprises enabling two groups of channels in succession, the channels of the groups being interleaved so that between actuated channels of either group there is disposed at least one unactuated channel of the other group, and actuating selected channels of each group of enabled channels to deposit sequences of droplets at the frequency of the energy pulses. Suitably, droplet ejection is effected by deflecting in shear mode piezo-electric portions of opposed walls which divide an actuated channel from channels of the array on respective opposite sides thereof and enabling for droplet ejection the channels of the groups at intervals of a half cycle of the frequency of the energy pulses.

In a further embodiment of the invention the channels are arranged in a plurality of rows each extending transversely to the direction of relative motion between the substrate and the apparatus and each having a nozzle pitch equal to a multiple of the number of rows of the pitch of the printing element areas in such transverse direction, the rows being disposed so that the nozzles of each row print printing element areas of a line which are interleaved with the areas which are printed by the nozzles of the other nozzle rows.

The invention also comprises a multi-channel array electrically pulsed, multi-tone, ink droplet deposition apparatus comprising a multiplicity of like parallel uniformly spaced channels, respective ink ejection nozzles communicating with and forming part of the channels, each of the channels having the same high longitudinal acoustic resonant frequency, a source of ink supply common to the channels and electrically actuatable means located in relation to the channels to enable in successive intervals application to ink in selected channels of the array of respective sequences of pulses of energy of amplitude and frequency to cause ink droplet ejection from the selected channels at or near the resonant frequency of the channels, each sequence of pulses containing a number of pulses to eject a corresponding number of discrete droplets of ink from the channel to which the sequence is applied, the number being determined by a desired tone of printing required to be effected from a respective channel.

Preferably, the channels include respective displaceable side wall portions and the electrically actuatable means are adapted to effect displacement of the side wall portions to impart the energy pulses to droplet liquid in the channels. Advantageously, the channels are formed in a body of piezo-electric material and have side wall portions poled so as to be displaceable by operation of the electrically actuatable means. Suitably, the side wall portions are poled so as to be displaced in shear mode by the electrically actuatable means.

In one embodiment the channels are arranged in a plurality of groups of interleaved channels, the channels of the respective groups being disposed in repeated sequences and the electrically actuatable means are adapted to enable the channel groups for droplet ejection in successive intervals and to actuate selected channels of each enabled group of channels for droplet ejection, the intervals being of duration to allow ejection of up to several droplets from the selected channels.

In another embodiment the channels are arranged in two groups of alternating channels and the electrically actuatable means are adapted to effect displacement of all channel dividing side walls so that displacement of facing channel dividing side walls of each channel effects droplet ejection therefrom, the electrically actuatable means being further adapted to enable the groups of channels for droplet ejection successively at intervals and to select channels from the enabled groups for droplet ejection, the interval for which each selected channel is enabled being sufficient to allow ejection of up to several droplets therefrom.

The invention will now be described, by way of example, with reference to the accompanying drawings, in which.

The method of the invention can be performed by a drop-on-demand ink jet printing apparatus comprising an array, preferably a high density array, preferably a high density array, of parallel uniformly spaced channels provided with respective droplet ejection nozzles, an ink supply common to said channels and electrically actuable means for displacing respective piezo-electric side wall portions of said channels to effect droplet ejection from the channels. In the prior U.S. Pat. No. 4,584,590 referred to the displaceable piezo-electric side wall portions are provided as the top or roof walls of the respective channels, the channel density being up to two per mm, whereas in our U.S. Pat. No. 4,887,100 there is described e.g. with reference to FIGS. 2(a)-(d), a form of printhead in which said displaceable piezo-electric wall portions comprise the channel dividing side walls. In this latter case each of the channel dividing side walls is shared between the channels which it separates so that in a first of successive phases of operation it can be deflected together with the facing wall of one of the channels which it separates to eject a droplet from said one of the channels whilst in a succeeding phase of the operation the said channel dividing wall together with the facing side wall of the other of the channels which it separates can be deflected to eject a droplet from said other of the channels. The channel densities of such printheads can be from 2 to 16 per mm. Hitherto, the operation of this form of printhead has been limited to the application of a voltage waveform pulse which acts to eject a single drop of ink from the channel to which the pulse is applied. The present invention calls for droplet ejection from the channels at high frequency at or near the longitudinal acoustic resonant frequency of the channels. Accordingly the channel length and nozzle dimensions have to be chosen to that end.

Printheads of the kind described can also be employed according to this invention as greyscale and, therefore, colour printers. An acceptable range of resolution of printing element areas or pixels on a paper substrate for a printhead as described in U.S. Pat. No. 4,887,100 referred to would be 6 to 12 per mm. In the area corresponding to each pixel, a variable number of droplets in the range 1 to 64 is made available as hereinafter described.

Typical values of ink drop parameters at each channel nozzle and on the paper substrate area are as follows:

| Resolution of Printhead | Pitch of Nozzles | Full 64 Droplet Volume | Single Drop Volume | Single Droplet Diameter | Droplet Frequency |
|---|---|---|---|---|---|
| —/mm | μm | pl | pl | μm | kHz |
| 12 | 83 | 33 | 0.51 | 10 | 180 |
| 6 | 167 | 130 | 2.04 | 15.7 | 90 |

The full size drop volume, which forms a pool of 64 single ejected small droplets on the paper substrate is chosen to form contiguous dots at full tone.

Figure 1:
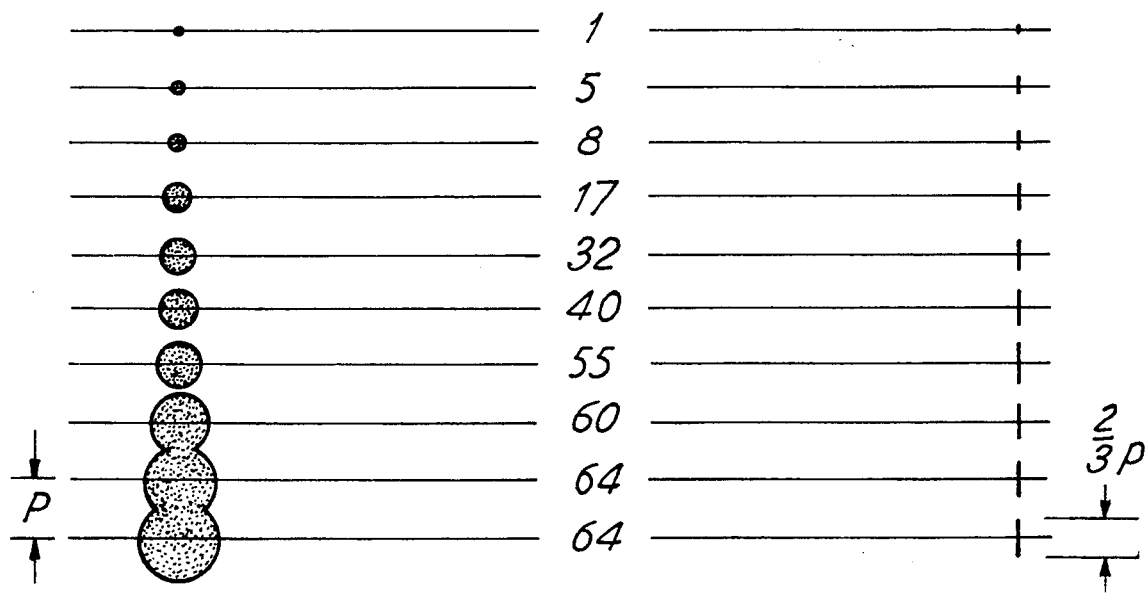
FIG. 1 illustrates the effect of depositing in successive printing element areas, that is to say, pixels, as the print medium moves past a nozzle of a channel of a drop-on-demand ink jet printer, a variable number of ink drops between 1 and 64.

FIG. 1 shows the effect of depositing a variable number of ink droplets between 1 and 64 in successive pixels as the paper moves past the nozzle. Typically, the maximum droplet production frequency is sufficient to generate 100 droplets per pixel, so that if 64 droplets are generated, these are deposited in a line occupying approximately 2/3 of the pixel pitch "p". When smaller numbers of droplets are generated as a sequence these are deposited along correspondingly shorter lines.

From the above table of typical values and assuming there are 100 droplets able to be generated per pixel, the spacing between droplets deposited longitudinally in each pixel, for twelve pixels per mm, is 0.83 $\mu$m and for six pixels per mm is 1.67 $\mu$m. Laterally the nozzle pitch is equal to the pixel pitch. The spacing in the lines in which they are deposited of the small droplets is small compared with the diameter of the small droplets, 0.83 $\mu$m compared with 10 $\mu$m for twelve pixels per mm and 1.67 $\mu$m compared with 15.7 $\mu$m for six pixels per mm. Also, the period during which a droplet sequence is ejected, i.e.

$$\frac{64 \times 10^3}{180000} = 0.35 \text{ msec.}$$

for 12 pixels per mm and $$\frac{64 \times 10^3}{90000} = 0.7 \text{ msec}$$

for six pixels per mm is short compared with the time, of a few milliseconds, that ink takes to be absorbed into the paper substrate.

Thus the deposited lines of ink droplets in each pixel have time to collect and spread as dots on the paper surface. The line in which the droplets from any particular nozzle are deposited has little effect on the shape but only on the diameter of the dot formed at the pixel. FIG. 1 shows that the relative timing of the deposition of the lines of droplets at the pixels is chosen so that each drop sequence is deposited symmetrically with respect to the corresponding pixel. This reduces any distortion in the image which could result in contouring and inhibits any tendency to merging of the droplets deposited at adjacent pixels.

Figure 2:
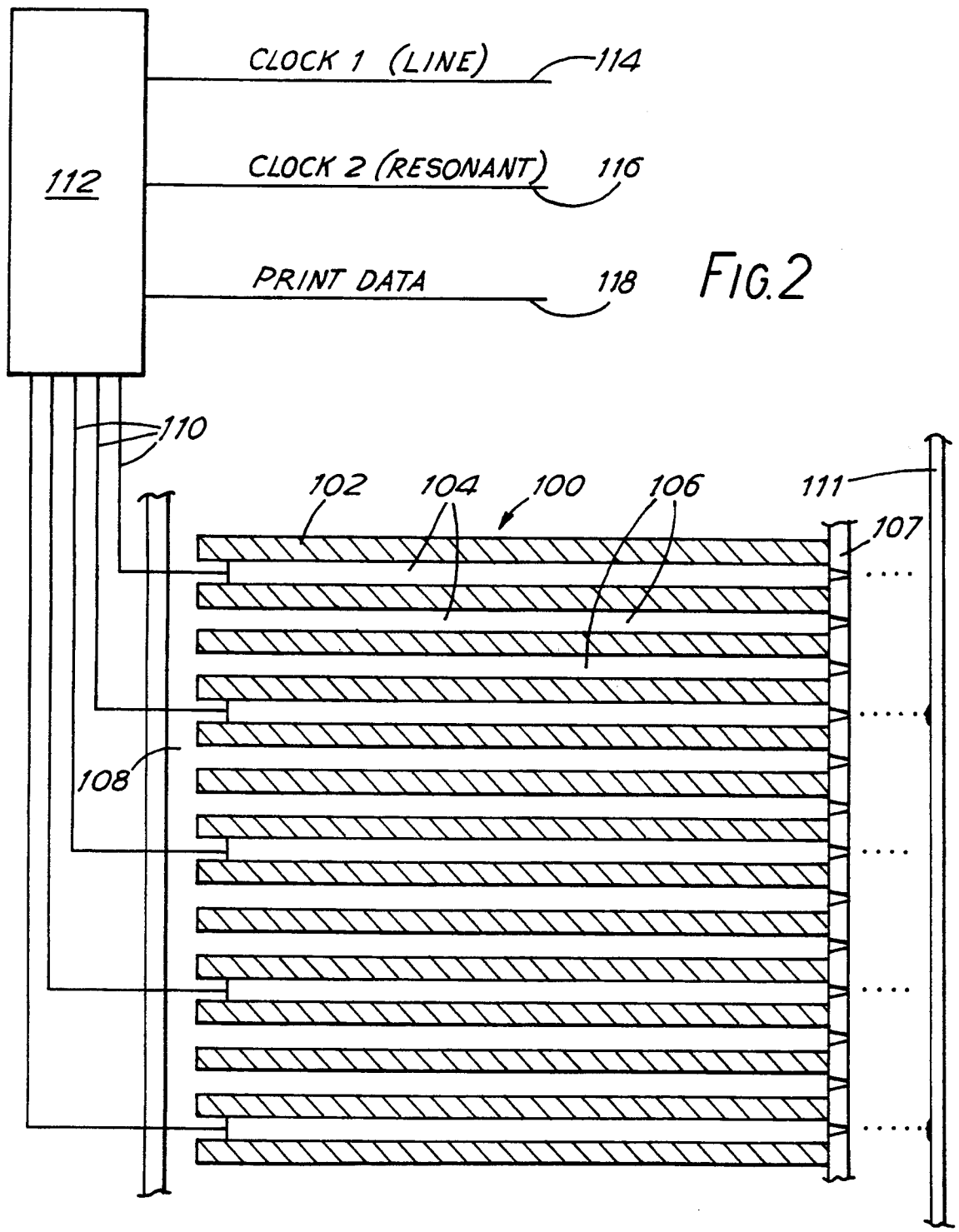
FIG. 2 illustrates diagrammatically one embodiment of the invention.

Referring now to FIG. 2, there is illustrated therein a printhead 100, which is generally similar to that described in relation to FIGS. 2(a) to (d) of U.S. Pat. No. 4,887,100 the contents of which are herein incorporated by reference. The printhead 100 comprises a sheet of piezo-electric material poled in a direction normal thereto and formed with parallel channels 104 at a density of two or more per millimetre having channel dividing side walls 106. The channels 104 are each lined with a metal electrode layer (not shown). The channels which are arranged in three groups of interleaved channels with the channels of the groups disposed successively, are actuated in shear mode by applying an electric potential difference between the electrode layer of an actuated channel and the electrode layers of the channels on either side of the actuated channel. The potential difference applied is a signal of frequency at or near the longitudinal acoustic resonant frequency of the channels and is applied for the duration of a number of pulses of the signal corresponding to the number of droplets which it is desired to eject from the actuated channel. The channels are supplied with printing liquid from a common supply duct 108 connected with each channel at the end thereof opposite that at which is located a nozzle plate 107 formed with respective nozzles 109 which terminate the channels. The nozzles of each group are co-linearly disposed transversely to the direction of substrate, e.g. paper movement and the groups of nozzles are spaced in the direction of substrate movement.

FIG. 2 illustrates circuitry for operating channels of one of the three channel groups. This comprises connections 110 to the electrodes of the channels of the group, like connections (not shown) being made to the electrodes of each of the channels of the other two groups.

The connections 110 lead to the channels 104 from a processor 112 which is supplied with clock pulses from a conductor 114, the pulses on which in sequence enable the connections 110 to the respective groups of channels. A further clock line conductor 116 provides the processor with clock pulses at a frequency at or near that of the longitudinal acoustic resonant frequency of the channels. Print data or line 118 in the form of multi-bit words (a) instructs the processor as to which channels of the group of channels which are enabled by the pulse on the conductor 114 are to be selected for actuation, (b) activates the selected channels each with a number from 1 to 64 of pulses at the frequency supplied by way of the conductor 116, and (c) locates the pulses activating the selected channels centrally in the period during which the connections 110 of the group are enabled.

The frequency of pulses supplied by way of the conductor 114 is one-hundredth that of the pulse frequency supplied by way of conductor 116 and the period of the pulses at the frequency supplied via conductor 114 is equal to the time taken for successive pixels on the substrate to pass the channel nozzles. It will be apparent that clock line conductor 114 is not strictly necessary since the processor can be arranged to afford pulses, divided from the pulses supplied by way of conductor 116, for enabling the connections 110 to the channels of each group at a frequency of one-hundredth that of the frequency supplied by way of the conductor 116.

It will also be appreciated that at any instant during operation, an actuated channel is separated from the next nearest actuated channel by at least two inactive channels. Because of this crosstalk between channels is reduced and risk of spurious droplet ejection from inactive channels adjacent actuated channels is avoided.

The spacing, referred to above, of channel nozzles of each group in the direction of printing substrate movement compensates for the time interval between the actuation of the selected channels of the groups so that printed spots deposited at the pixels of each row thereof transverse to substrate movement appear substantially collinear.

Figure 3:
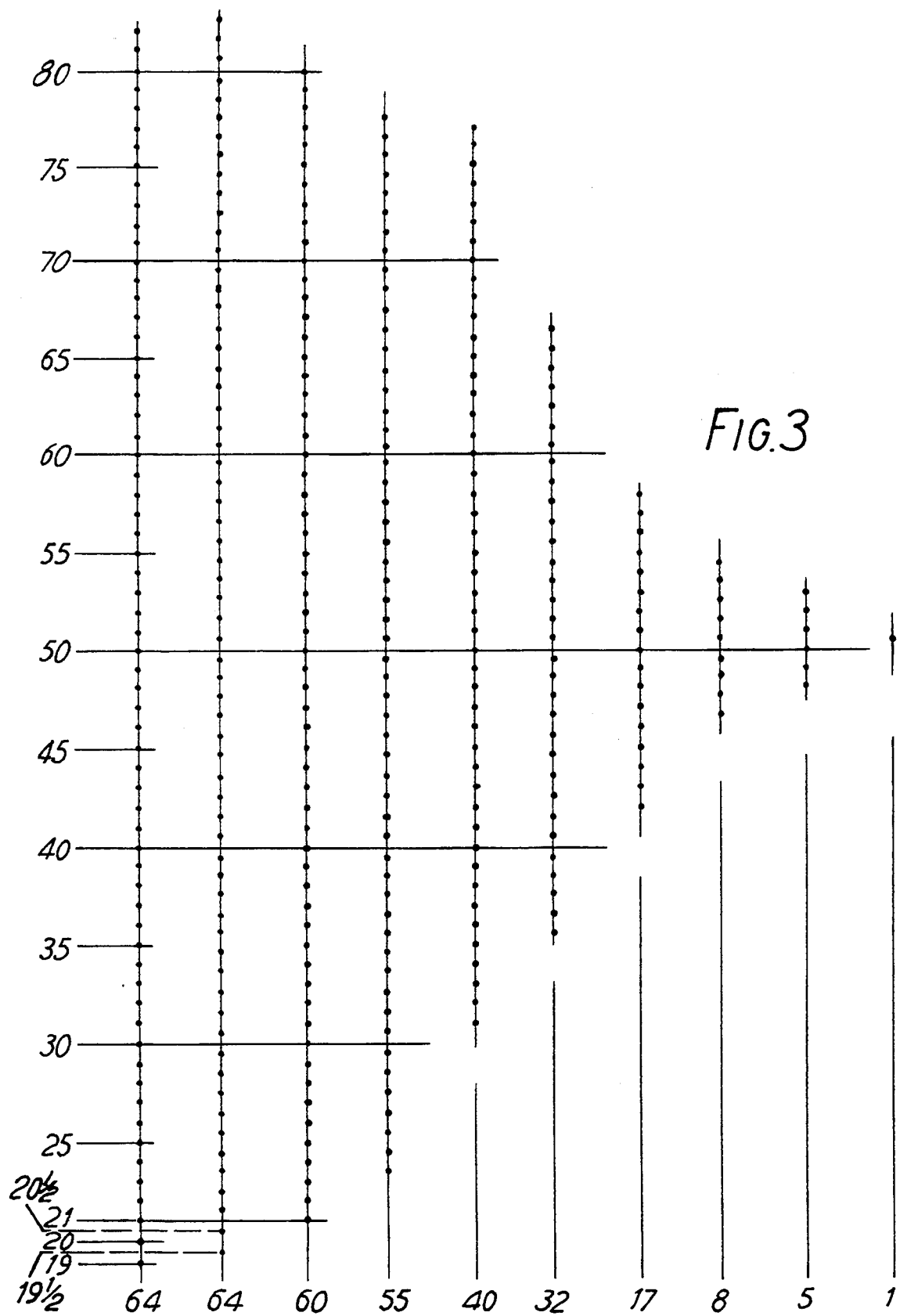
FIG. 3 illustrates diagrammatically, in another embodiment of the invention, the printing of a line of printing element areas or pixels from a group of ten channels, the respective nozzles of which eject bursts of varying numbers of droplets between 1 and 64.

FIG. 3 illustrates diagrammatically an alternative manner in which the droplets are ejected from the nozzles of ten channels of a segment of a high density array printhead of the type described in our U.S. Pat. No. 4,887,100, for example, with respect to FIGS. 2(a) to (d) thereof. The channels here are arranged in two groups of interleaved odd and even numbered channels. To activate a set of adjacent channels, the selected channels of one group are activated by applying a resonant waveform in alternating phase with the channels of the other group. Thus drops are ejected from channels of the two groups in numbers depending on the number of waveforms applied in alternating phases of the resonant waveform as the dividing walls pressurise channels of the interleved groups alternately.

In FIG. 3 the densities at pixels opposite the ten channel nozzles are for channels 1 to 10 respectively 64, 64, 60, 55, 40, 32, 17, 8, 5 and 1 droplets. A single pixel in the direction of relative motion between the printhead and paper substrate is traversed in a period which is equal to the period of 100 cycles of the resonant frequency of the channels, i.e. for the frequencies 180 KHz and 90 KHz of the table set out above of typical values, respectively, 0.55 and 1.11 msecs. These times are those which it would take to emit 100 droplets from each channel. The dots in the drawing represent droplets a maximum of 64 of which are deposited from any particular channel per pixel and the actuation of the channels is preferably arranged so that the droplets deposited from any particular channel are symmetrically deposited with respect to the pixel being printed, that is to say the centre of the pixel is traversed after the elapse of fifty of the hundred cycles allocated to that pixel. The lateral pitch of the channel nozzles is made equal to the longitudinal pitch of the pixels traversed by each nozzle.

Thus in each pixel period, i.e. the period in which, if supplied to the electrodes of any particular channel, the applied voltage pulses would generate 100 droplets, the number of droplets from each channel would be between one and sixtyfour in the numbers stated earlier.

The droplets are ejected from the selected odd numbered channels as a result of actuation of the channels during the positive parts of the cycles and the selected even numbered channels are actuated one half cycle following, that is to say, out of phase with, activation of the selected odd numbered channels.

Printing starts with the pixels having the maximum number, i.e. 64, of droplets which are the pixels traversed by the nozzles of channels 1 and 2 and the timing of droplet deposition proceeds as follows:

| Cycles | Channels Depositing Drops | Cycles | Channels Depositing Drops | Cycles | Channels Depositing Drops |
|---|---|---|---|---|---|
| 0 to 18 | NIL | 30½ | 2,4 | 42½ | 2,4,6 |
| 19 | 1 | 31 | 1,3,5 | 43 | 1,3,5,7 |
| 19½ | 2 | 31½ | 2,4 | 43½ | 2,4,6 |
| 20 | 1 | 32 | 1,3,5 | 44 | 1,3,5,7 |
| 20½ | 2 | 32½ | 2,4 | 44½ | 2,4,6 |
| 21 | 1,3 | 33 | 1,3,5 | 45 | 1,3,5,7 |
| 21½ | 2 | 33½ | 2,4 | 45½ | 2,4,6 |
| 22 | 1,3 | 34 | 1,3,5 | 46 | 1,3,5,7 |
| 22½ | 2 | 34½ | 2,4 | 46½ | 2,4,6 |
| 23 | 1,3 | 35 | 1,3,5 | 47 | 1,3,5,7 |
| 23½ | 2,4 | 35½ | 2,4,6 | 47½ | 2,4,6,8 |
| 24 | 1,3 | 36 | 1,3,5 | 48 | 1,3,5,7 |
| 24½ | 2,4 | 36½ | 2,4,6 | 48½ | 2,4,6,8 |
| 25 | 1,3 | 37 | 1,3,5 | 49 | 1,3,5,7,9 |
| 25½ | 2,4 | 37½ | 2,4,6 | 49½ | 2,4,6,8 |
| 26 | 1,3 | 38 | 1,3,5 | 50 | 1,3,5,7,9 |
| 26½ | 2,4 | 38½ | 2,4,6 | 50½ | 2,4,6,8,10 |
| 27 | 1,3 | 39 | 1,3,5 | 51 | 1,3,5,7,9 |
| 27½ | 2,4 | 39½ | 2,4,6 | 51½ | 2,4,6,8 |
| 28 | 1,3 | 40 | 1,3,5 | 52 | 1,3,5,7,9 |
| 28½ | 2,4 | 40½ | 2,4,6 | | |
| 29 | 1,3 | 41 | 1,3,5 | etc. | etc. |
| 29½ | 2,4 | 41½ | 2,4,6 | | |
| 30 | 1,3 | 42 | 1,3,5,7 | 83 to 100 | NIL |

It will be apparent from inspection of the above table that the band of actuated channels gradually widens and then narrows. Channel No. 1 thus deposits drops every cycle from cycle 19 to cycle 82, channel No. 2 every half cycle from cycle 19½ to 82½, channel No. 3 every cycle from cycle 21 to cycle 80, channel No. 4 every half cycle from cycle 23½ to cycle 79½, channel 5 every cycle from cycle 31 to cycle 70, channel 6 every half cycle from cycle 35½ to cycle 66½, channel 7 every cycle from cycle 42 to cycle 58, channel 8 every half cycle from cycle 47½ to 54½, channel 9 every half cycle from cycle 49 to cycle 53, and channel 10 at half cycle 50½.

By reducing the period in which a pixel is traversed and reducing the density of printing, it becomes possible to simulate the laying down of lines of varying linear density.

Although in operation of either of the described embodiments of the invention the frequency of operation, which may be in the range 25 to 250 KHz, and the small size of nozzle employed tend to ensure that the drop sequences emitted from the nozzles comprise separate drops, there may be an inclination for the first few drops of a sequence to merge. This can be avoided by applying initial sub-threshold resonant waveforms or by increasing the energy content of the first few pulses applied by the electrically operated means of the printhead to the channel selected for droplet ejection.

It is to be noted that the embodiment of FIG. 3 represents a higher speed (×3) embodiment of printhead. However it is limited in the range of patterns it will print, to a maximum spatial frequency. It will print "white, black, white"; but not "black, white, black" across the row of channels. Differently expressed, the embodiment of FIG. 3 with a density of nozzles at 12 per mm, prints any pattern at spatial frequencies of and below 4 lines per mm; but is restricted in the patterns that can be printed at spatial frequency of 6 lines per mm. The embodiment of FIG. 2 does not have such a restriction but operates more slowly.

In the embodiments of the invention described with reference to FIGS. 2 and 3 the pulses of energy applied to the printing liquid in the channels of the array are obtained by the use of electrically displaceable channel side walls. Fluid resonance in the channels of the printhead can however be accomplished in other ways. For example, as earlier referred to, thermal energy pulses can be imparted to liquid in the channels for droplet ejection. To perform the present invention the pulses would be applied at or near the natural longitudinal resonant frequency of the channels, the length and channel dimensions of which would be made such as to provide the requisite high resonant frequency above 25 KHz. At relatively low specific energy, the energy coupling to the liquid in the channels involves thermal expansion and contraction of the liquid and, above a specific energy threshold, the energy input to the channel liquid would cause bubble nucleation and collapse.

Alternative forms of actuation which might possibly be considered involve a fluid which swells in the presence of a field or which becomes solid and thus inhibits displacement in the presence of a field, the resonant energy being applied externally.

We claim:

1. A method of multi-tone printing employing drop-on-demand printing apparatus comprising an array of like uniformly spaced parallel ink channels, respective ink ejection nozzles provided for and forming part of the channels, each of the channels having an identically high longitudinal acoustic resonant frequency, an ink supply common to the channels, electrically actuatable means for applying pulses of energy to ink in the channels to effect ejection of droplets of ink therefrom and a substrate movable relative to the channels and having printing element areas on which the droplets are deposited, said method comprising the steps of:

identifying selected ones of the channels for actuation in successive periods;

determining a desired tone of printing for each of said selected channels;

applying to ink in each of the selected channels, a respective sequence of pulses of energy of amplitude and frequency to cause ink droplet ejection therefrom at or near the resonant frequency of the channels, each of said sequences of pulses containing a number of pulses to eject a corresponding number up to sixty four of discrete droplets in a corresponding sequence of droplets for effecting the printing tone determined for a respective one of said selected channels; and moving said substrate continuously relative to the printing apparatus, wherein each of said sequences of droplets is deposited symmetrically within a length of the printing element areas traversing a channel from which deposition of the respective sequence of droplets takes place.

2. The method of claim 1 wherein said applying step comprises applying said sequences of pulses of energy to ink in said selected channels by displacing respective side wall portions of said selected channels.

3. The method of claim 2 wherein said applying step comprises applying said sequences of pulses of energy to ink in said selected channels by displacing respective piezo-electric side wall portions of said selected channels.

4. The method of claim 1 wherein said applying step comprises applying said sequences of pulses of energy by imparting sequences of thermal stresses to the ink in said selected channels.

5. The method of claim 4 wherein said imparting step comprises imparting said sequences of thermal stresses of magnitude to cause bubble nucleation and collapse in said selected channels.

6. A method of multi-tone printing employing drop-on-demand printing apparatus comprising an array of like uniformly spaced parallel ink channels, respective ink ejection nozzles provided for and forming part of the channels, each of the channels having an identically high longitudinal acoustic resonant frequency, an ink supply common to the channels, electrically actuatable means for applying pulses of energy to ink in the channels to effect ejection of droplets of ink therefrom and a substrate movable relative to the channels and having printing element areas on which the droplets are deposited, said method comprising the steps of:

identifying selected ones of the channels for actuation in successive periods;

determining a desired tone of printing for each of said selected channels; and applying to ink in each of the selected channels at a frequency of at least 25 Khz, a respective sequence of pulses of energy of amplitude and frequency to cause ink droplet ejection therefrom at or near the resonant frequency of the channels, each of said sequences of pulses containing a number of pulses to eject a corresponding number of discrete droplets for effecting the printing tone determined for a respective one of said selected channels.

7. The method of claim 6 including continuously moving said substrate relative to the printing apparatus and depositing said sequences of droplets from said selected channels over a length of said substrate within a printing element area traversing said channel.

8. The method of claim 7 wherein said depositing step comprises depositing said number of discrete droplets from said selected channels over approximately two thirds of the length of the respective printing element areas.

9. The method of claim 7 wherein said depositing step comprises depositing in each of said number of discrete droplets any number up to sixty four of said droplets.

10. The method of claim 6 wherein said depositing step comprises depositing said droplets from successive channels of said array at a same pitch on the substrate as said printing element areas.

11. The method of claim 6 including arranging said channels in a plurality of groups of interleaved channels, enabling for droplet ejection the channels of the respective groups in succession so that the actuated channels of any one of said groups are separated by at least one unactuated channel of another one of said groups, and actuating the selected channels of an enabled group of channels by displacement in shear mode of opposed channel dividing side walls of each of said selected channels to deposit a sequence of droplets therefrom at the frequency of said energy pulses.

12. The method of claim 6, including arranging said channels in two groups of interleaved channels, enabling for droplet ejection the channels of said two groups of channels in succession so that between the actuated channels of either of said groups there is disposed at least one unactuated channel of the other group, and actuating selected channels of each of said groups of enabled channels to deposit sequences of droplets therefrom at the frequency of said energy pulses.

13. The method of claim 12 wherein said actuating step comprises actuating said selected channels in each of said groups in successive pulses of the frequency of said energy pulses.

14. The method of claim 13 including ejecting droplets from each of said actuated channels by deflecting in shear mode piezo-electric portions of opposed walls thereof which divide each of said actuated channels from the channels of the array on respective opposite sides thereof, and enabling for droplet ejection the channels of said groups at intervals of a half cycle of the frequency of said energy pulses.

15. The method of claim 6 including arranging said channels in three groups of interleaved channels, enabling for droplet ejection the channels of said three groups of channels in succession so that between the actuated channels of any one of said groups there is disposed at least one unactuated channel of each of said other groups, and simultaneously actuating the selected channels of each enabled group.

16. The method of claim 6 wherein said applying step comprises applying said energy pulses at a frequency in a range of between 50 KHz and 250 KHz.

17. The method of claim 6 including controlling an energy content of initial pulses of each of said sequences of energy pulses to ensure that the droplets emitted in response to said initial pulses are mutually separated.

18. The method of claim 6 including arranging said channels in a plurality of rows each extending transversely to a direction of relative motion of the substrate and the apparatus, each of said rows having a nozzle pitch equal to a multiple of the number of said rows and a pitch of said printing element areas in said transverse direction, and disposing the rows of channels and their respective nozzles so that the nozzles of each of said rows print printing element areas of a line which are interleaved with areas which are printed by the nozzles of other rows.

19. A method of multi-tone printing employing drop-on-demand printing apparatus comprising an array of like uniformly spaced parallel ink channels, respective ink ejection nozzles provided for and forming part of the channels, each of the channels having an identically high longitudinal acoustic resonant frequency, an ink supply common to the channels, electrically actuatable means for applying pulses of energy to ink in the channels to effect ejection of droplets of ink therefrom and a substrate movable relative to the channels and having printing element areas on which the droplets are deposited, said method comprising the steps of:

identifying selected ones of the channels for actuation in successive periods;

determining a desired tone of printing for each of said selected channels;

applying to ink in each of the selected channels, a respective sequence of pulses of energy of amplitude and frequency to cause ink droplet ejection therefrom at or near the resonant frequency of the channels, each of said sequences of pulses containing a number of pulses to eject a corresponding number of discrete droplets for effecting the printing tone determined for a respective channel one of said selected channels including effecting printing of a line of printing element areas on said substrate which extends transversely to a direction of relative motion of the array and the substrate, with the substrate and the array stationary, and effecting relative movement between each printing step of the substrate and the array by an amount equal to a dimension of the printing element areas in the direction of said relative movement.

20. The method of claim 19 including printing each of said printing element areas from one of four channels, said four channels having respective ink supplies of black ink and ink of the three primary colors thereby enabling printing of said areas in black or in one of said primary colors.

21. A multi-channel array electrically pulsed, multi-tone, ink droplet deposition apparatus comprising a multiplicity of like uniformly spaced parallel ink channels, respective ink ejection nozzles communicating with and forming part of said channels, each of said channels having an identically high longitudinal acoustic resonant frequency, a source of ink supply common to said channels, and electrically actuatable means located in relation to said channels to enable in successive intervals application to ink in selected channels of said array of respective sequences of pulses of energy of amplitude and frequency to cause ink droplet ejection from the selected channels at or near the resonant frequency of the channels, each of said sequences of pulses containing a number of pulses to eject a corresponding number of discrete droplets of ink from the channel to which said sequence is applied onto a substrate, said number being predetermined by a desired tone of printing required to be effected from a respective channel, wherein said substrate is divided into printing element areas on which the selected channels deposit droplets when actuated, said deposition of droplets taking place when the array and substrate are stationary and including transport means for effecting relative movement of the substrate and the array between each printing from selected channels of the array by a pitch of said printing element areas in a direction of said relative movement.

22. Apparatus according to claim 21 wherein said channels are arranged in a plurality of groups of interleaved channels, the channels of the respective groups being disposed in repeated sequences and said electrically actuatable means enabling the channel groups for droplet ejection in successive intervals and to actuate selected channels of each enabled group of channels for droplet ejection, said intervals being of duration to allow ejection of up to several droplets from the selected channels.

23. Apparatus according to claim 22 wherein said channels have displaceable channel dividing side walls and are arranged in at least three groups of interleaved channels, said electrically actuatable means actuating all of said channel dividing side walls with facing ones of said channel dividing side walls being displaced by said electrically actuatable means to effect droplet ejection from the channel therebetween.

24. Apparatus according to claim 23 wherein said electrically actuatable means are providing an interval between enabling of the groups of channels sufficient for ejection from said selected channels of up to sixty four droplets.

25. Apparatus according to claim 21 wherein said channels are arranged in two groups of alternating channels and said electrically actuatable means are effecting displacement of all actuated channel dividing side walls so that displacement of facing channel dividing side walls of each actuated channel effects droplet ejection therefrom, said electrically actuatable means further enabling the groups of channels for droplet ejection successively at intervals and to select channels from the enabled groups for droplet ejection, the period for which each of said selected channel is enabled being sufficient to allow ejection of up to several droplets therefrom.

* * * * *